US012759470B2

(12) United States Patent
Williams

(10) Patent No.: US 12,759,470 B2
(45) Date of Patent: Oct. 13, 2026

(54) CARGO COVER SYSTEM

(71) Applicant: Marty Williams, Worland, WY (US)

(72) Inventor: Marty Williams, Worland, WY (US)

( * ) Notice: Subject to any disclaimer, the term of this patent is extended or adjusted under 35 U.S.C. 154(b) by 210 days.

(21) Appl. No.: 18/829,117

(22) Filed: Sep. 9, 2024

(65) Prior Publication Data

US 2025/0083614 A1 Mar. 13, 2025

Related U.S. Application Data

(60) Provisional application No. 63/581,570, filed on Sep. 8, 2023.

(51) Int. Cl.

*B60R 9/10* (2006.01)
*B60R 9/06* (2006.01)
*B62J 19/00* (2006.01)
*E04H 15/06* (2006.01)
*E04H 15/36* (2006.01)

(52) U.S. Cl.

CPC .................. *B60R 9/10* (2013.01); *B60R 9/06* (2013.01); *B60R 9/065* (2013.01); *B62J 19/00* (2013.01); *E04H 15/06* (2013.01); *E04H 15/36* (2013.01); *B65D 2585/6862* (2013.01); *Y10S 224/924* (2013.01)

(58) Field of Classification Search

CPC .. B60R 9/065; B60R 9/10; B60R 9/06; E04H 15/06; E04H 15/36; Y10S 224/924; B60P 3/06; B62J 19/00

USPC ................ 135/88.08, 88.13, 88.14; 150/167; 224/519, 924

See application file for complete search history.

(56) References Cited

U.S. PATENT DOCUMENTS 3,207,396 A * 9/1965 Mundell .................. B60D 1/52 224/500
3,968,913 A * 7/1976 Weed ....................... B62J 19/00 224/532
4,009,744 A * 3/1977 Joslyn ...................... B60R 9/10 224/535
4,421,260 A * 12/1983 DeVore ................... B60R 9/065 224/927
5,199,842 A * 4/1993 Watt ..................... A61G 3/0209 224/500
6,145,720 A * 11/2000 Comeau .................. B60R 9/065 224/532

(Continued)

*Primary Examiner* — Robert Canfield
(74) *Attorney, Agent, or Firm* — Apex Juris, pllc; Tracy M. Heims

(57) ABSTRACT

A cargo cover system for use with and connectable to a cargo carrier having at least a first mounting member and a second mounting member, comprising a cargo cover frame and a cargo carrier cover, the cargo cover frame having elongated first and second side support members, each side support member having first and second ends, a first and second angles forming a middle portion between the two ends, a receiver hole located between the two angles in the middle portion, a side mounting member connecting apparatus and a side locator insertable into the corresponding cargo carrier mounting member, and a fastener insertable through the receiver hole and the side locator and is releasably affixable to the side mounting member connecting apparatus, a first side upper support member, a first side lower support member, a second side upper support member, and a second side lower support member.

20 Claims, 16 Drawing Sheets

(56) References Cited

U.S. PATENT DOCUMENTS

| | | | | |
|---|---|---|---|---|
| 6,405,771 | B1 * | 6/2002 | Mote | B62J 19/00 296/136.01 |
| D717,718 | S * | 11/2014 | Williams | D12/408 |
| D722,289 | S * | 2/2015 | Williams | D12/408 |
| 9,403,473 | B2 * | 8/2016 | Soklaski | B60P 3/122 |
| 10,118,659 | B1 * | 11/2018 | O'Neill | B60R 9/06 |
| 10,384,618 | B2 * | 8/2019 | Williams | B60R 9/10 |
| 2009/0056592 | A1 * | 3/2009 | Threet | B60R 9/06 108/11 |
| 2011/0240700 | A1 * | 10/2011 | Williams | B60R 9/10 224/533 |
| 2014/0131407 | A1 * | 5/2014 | Reiseder | B60R 9/06 224/519 |
| 2021/0000234 | A1 * | 1/2021 | Kax | B62J 19/00 |
| 2026/0145622 | A1 * | 5/2026 | Deschene | B60R 9/10 |

* cited by examiner

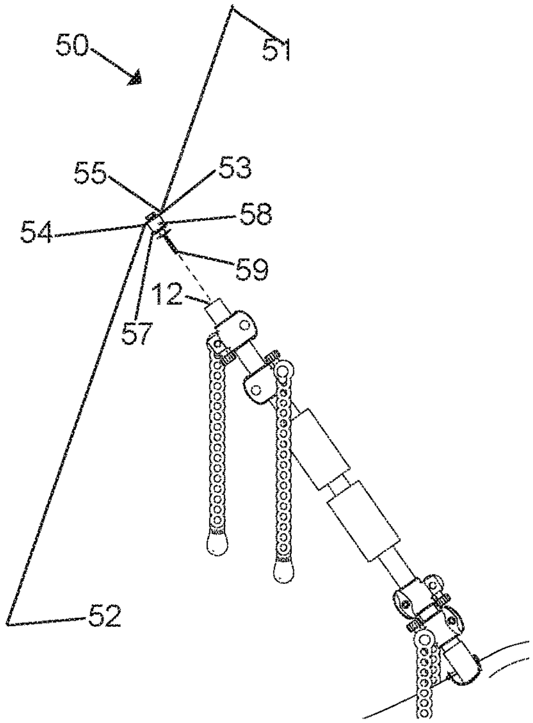
FIG. 7A
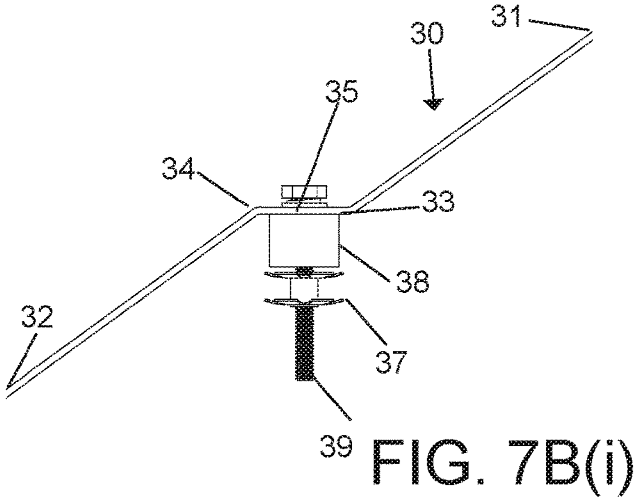
FIG. 7B(i)
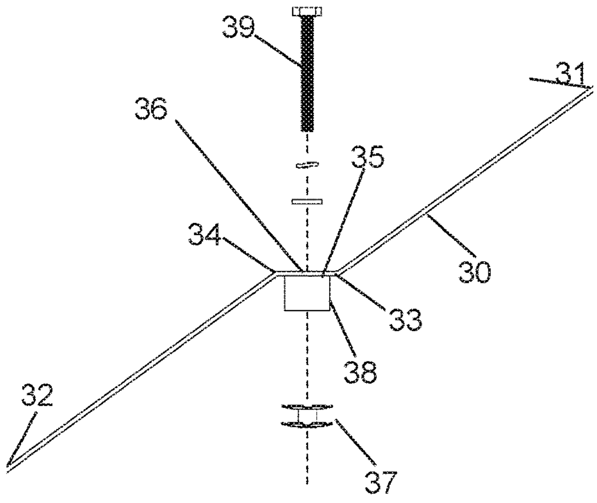
FIG. 7B(ii)

CARGO COVER SYSTEM

CONTINUITY AND CLAIM OF PRIORITY

This application is a U.S. non-provisional patent application depending upon and claiming the benefit and priority of a U.S. provisional patent application Ser. No. 63/581,570, filed on Sep. 8, 2023.

BACKGROUND OF THE INVENTION

Field of the Invention

The present invention relates generally to a protective cover that can protect cargo, such as a bicycle or bicycles, from the elements and further deters theft. Specifically, the present invention relates to a cargo cover system for use with and connectable to a cargo carrier on a vehicle to protect the cargo and secure the cargo and to reduce the temptation of would-be thieves. More specifically, the present invention relates to a bicycle cover accessory for bicycles, particularly, bicycles mounted to the rear of a vehicle and more specifically, mounted on a cargo carrier with at last a first mounting member and a second mounting member, such as a V-Shaped bicycle carrier.

Description of the Related Art

Currently there are a variety of bicycle carrying bags on the market but overall, the designs and products are meant to be used to wrap a bicycle and carry the bicycle with the bag. To accomplish this feat, many of these bags have wheels on the bottom or provide some way to roll or move the bicycle easily whilst it is in the bag. Oddly enough, there are few, if any, bicycle bags designed to cover a bicycle when it is hanging from an automotive, trailer or vehicle bicycle rack. Racks currently offered in the marketplace hang on the bicycle and do not provide any type of internal structure, they are difficult and cumbersome to use when covering and uncovering bicycles.

Bicycles hanging from the rear of vehicles on bicycle racks are subject to rain, snow, sunlight, heat, dirt and debris. Covering the bicycle obviously protects it from the elements. In addition, bicycles hanging from bicycle racks on vehicles are open and exposed. Anyone can see the type of bicycle and if the bicycle is expensive, the likelihood of theft increases.

An internet search revealed no identical products on the market at the time of invention. As noted above, there are a variety of carry cases for bicycles, but most are designed for shipping via aircraft, or possibly placing the entire case within a truck bed or other cargo carrier. There are several cargo covers or bicycle covers available but again, most if not all provide no structure, no framing, are difficult and cumbersome to use and provide no lighting.

Accordingly, a need exists for an easy, quick and convenient means to carry cargo on the outside of a vehicle and to cover and protect that cargo. In addition, there is a need for a system that provides a structured and framed cargo carrier.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. These and other aspects of the invention will be apparent from and elucidated with reference to the embodiment(s) described hereinafter.

OBJECTS AND SUMMARY OF THE INVENTION

The present invention is a cargo cover system for use with and connectable to a cargo carrier that has at least a first mounting member and a second mounting member, such as a V-Shaped rack. A preferred embodiment of the cargo cover system is designed to be used to cover and protect bicycles, but the cargo cover system can be used to cover and protect any cargo mounted on the cargo carrier. Accordingly, it is a general object of the present invention to provide an improved cargo carrier cover system usable with a wide variety of cargos but specifically designed to be used with bicycles.

Further objects and advantages of this invention will become apparent from consideration of the drawings and ensuing description thereof.

A method of building a cargo cover system is also provided. The method for building the cargo cover system can be applied and used for bicycle carriers mounted to the rear of vehicles, such as cars, trucks, SUVS, to the rear of recreational vehicle trailers or drivable recreational vehicles, or even to carriers mounted to the front of recreational vehicle trailers or other trailers, such as with a Jack-It system, as described in U.S. Pat. No. 10,576,902.

BRIEF DESCRIPTION OF THE DRAWINGS

FIG. 7A is a side view of the embodiment of the cargo cover system in FIGS. 5-6B, showing how the elongated second side support member attaches to the second mounting member of the V-shaped cargo carrier.

FIG. 7B(i) is an assembled view and FIG. 7B(ii) is an exploded view of the elongated first side support member of the embodiment of the cargo cover system in FIGS. 5-7A.

DETAILED DESCRIPTION OF THE PREFERRED EMBODIMENTS

Figure 1:
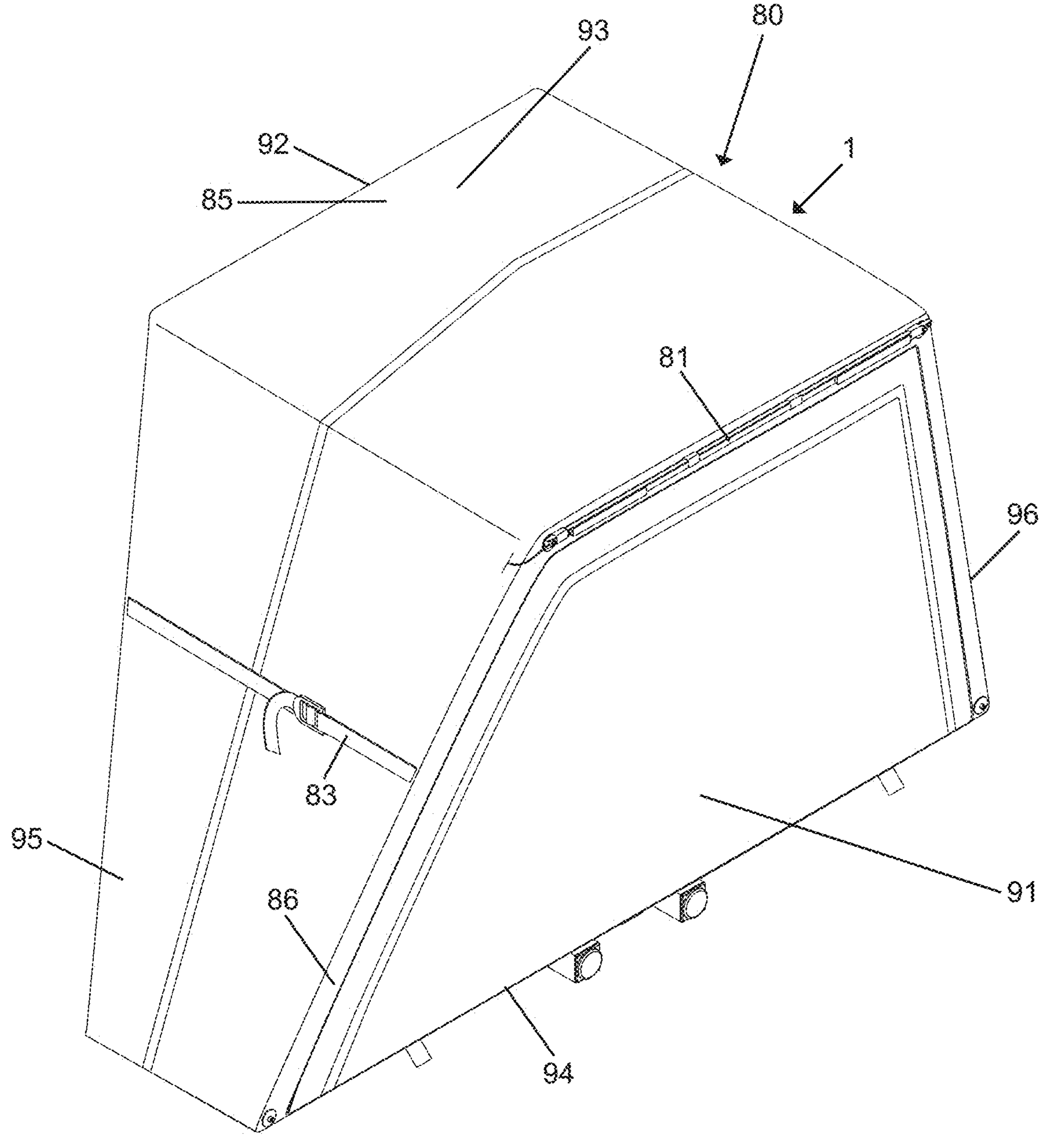
FIG. 1 is an elevated perspective view of an embodiment of the cargo cover system when completely assembled.

This invention features several advantages over the prior art. First is the ability to more securely cover and lock down contents within a cargo cover system. Second is to provide a framed cargo carrier cover that is easily installable on a cargo carrier with at least a first mounting member and a second mounting member, such as a V-Shaped cargo carrier. Third, is to provide easy ingress and egress for cargo, such as bicycles, specifically e-bicycles. Fourth, is to provide a lighting system on an exterior of the cargo cover system that is connectable to the vehicles lighting system.

In a preferred embodiment the cargo cover system is used in conjunction with a cargo carrier or a cargo carrying rack, and specifically, with a V-Shaped cargo carrier. A first embodiment used with typical bikes, such as road bikes or mountain bikes, is made from a lighter fabric for the cover. In a second embodiment the cover utilizes a heavier material, such as a heavy-duty and durable waterproof PVC material, and the cargo cover system is used in combination with a cargo carrier having at least a first mounting member and a second mounting member, such as a reinforced, electric bike V-Shaped cargo carrier. This electric bike cargo carrier is heavier and more reinforced than the standard V-Shaped cargo carrier used with regular bicycles, as it is designed to withstand heavier loads, such as the additional weight associated with e-bikes. This cargo carrier can be made from square metal tubing, round metal tubing, or any other type of tubing that will form the V-Shape for the cargo carrier.

With reference to the FIGS. 1-10C, an assembly method and invention description is set out. As seen in FIGS. 6A, 6B, the present invention is a cargo cover system 1 for use with and connectable to a cargo carrier 10 where the cargo carrier 10 has at least a first mounting member 11 and a second mounting member 12. The first and second mounting members 11, 12 can be tubes but could be of any elongated shape known in the art. The cargo cover system 1 comprises a cargo cover frame 20 and a cargo carrier cover 80 that covers the cargo cover frame 20. As shown in FIGS. 7A and 7B, the cargo cover frame 20 has an elongated first side support member 30 having a first side support member first end 31, a first side support member second end 32, a first side support member first angle 33, and a first side support member second angle 34. The first and second angles 33, 34 form a first side support member middle portion 35 between the first side support member first end 31 and the first side support member second end 32. The elongated first side support member 30 further has a first side support member receiver hole 36 located between the two angles 33, 34 in the first side support member middle portion 35, a first side mounting member connecting apparatus 37 insertable into the cargo carrier 10 first mounting member 11, a first side locator 38 insertable into the cargo carrier 10 first mounting member 11, and a first fastener 39. The first fastener 39 is insertable through the first side support member receiver hole 36 and the first side locator 35 and is releasably affixable to the first side mounting member connecting apparatus 37. The cargo cover frame 20 further has a first side upper support member 40 perpendicularly connectable to the first side support member first end 31, and a first side lower support member 42 perpendicularly connectable to the first side support member second end 32. Next, the cargo cover frame 20 has an elongated second side support member 50. The elongated second side support member 50 has a second side support member first end 51, a second side support member second end 52, a second side support member first angle 53, a second side support member second angle 54. The first and second angles 53, 54 form a second side support member middle portion 55 between the second side support member first end 51 and the second side support member second end 52. The elongated second side support member 50 further has a second side support member receiver hole 56 located between the two angles 53, 54 in the second side support member middle portion 55, a second side mounting member connecting apparatus 57 insertable into the cargo carrier 10 second mounting member 12, a second side locator 58, insertable into the cargo carrier 10 second mounting member 12, and a second fastener 59. The second fastener 59 is insertable through the second side support member receiver hole 56 and the second side locator 58 and is releasably affixable to the second side mounting member connecting apparatus 57. Finally, the cargo cover frame 20 further has a second side upper support member 60 perpendicularly connectable to the second side support member first end 51, and a second side lower support member 62 perpendicularly connectable to the second side support member second end 52.

In a preferred embodiment, the cargo cover frame 20 further has an upper cross support 70, preferably a bent support, connectable to the first side support member first end 31 and the second side support member first end 51.

The first side mounting member connecting apparatus 37 and the second mounting member connecting apparatus 57 can be tube nuts as shown in FIGS. 6B-7B, but can be any connecting apparatus known in the art that fits into a mounting member of a cargo carrier. A tube nut, or star fangled nut, is a method for creating a threaded hole in tubes. It eliminates the need for other more costly methods, such as welding or flow drilling and allows for the attachment of a wide range of threaded rod, or bolt components to tubes. The tube nut is simply pushed into the tube where it then provides a threaded anchor for the mating component. The first side locator 38 and the second side locator 58 can be a tube or tube shaped member, as shown in FIGS. 6B-7B, but can be any shape that fits into a mounting member of a cargo carrier. The first fastener 39 and the second fastener 59 can be a bolt as shown in FIGS. 6B-7B, but any fastener known in the art can be used.

Figure 5:
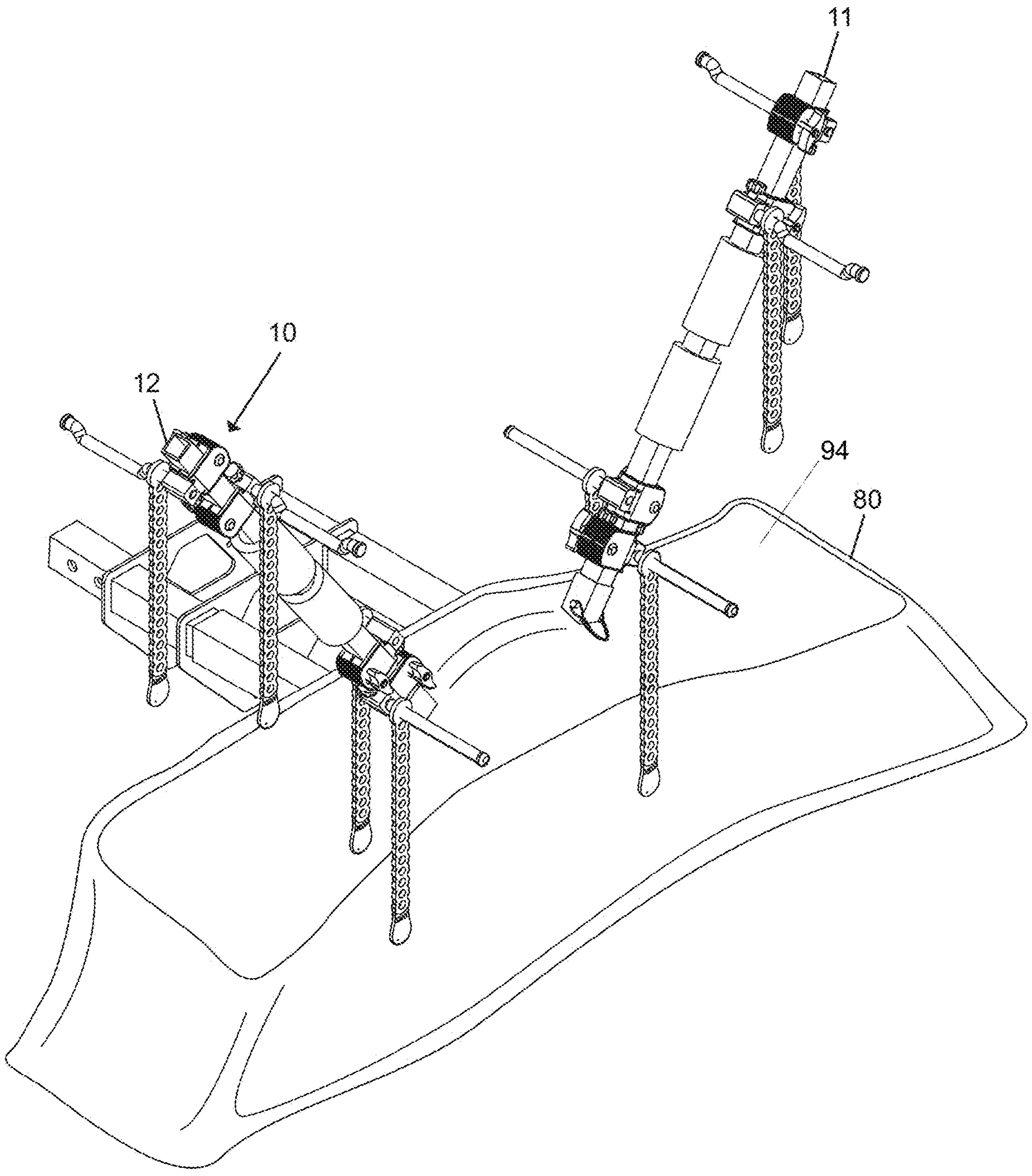
FIG. 5 is an elevated perspective view of an embodiment of the cargo cover system prior to assembly, showing a cargo carrier cover on a V-Shaped cargo carrier.

FIGS. 5-7E show the steps used to build or assemble, incorporate, and connect the cargo cover system 1 to the V-Shaped cargo carrier 10. As can be seen in FIG. 5, the V-Shaped cargo carrier 10 is connected to a shaft of a twin tube. This twin tube, described and shown more fully in U.S. Pat. No. D717718, has one main shaft that is inserted into a receiver that is affixed to a vehicle's rear end. The main shaft extends from the vehicle receiver and is met by a perpendicular member that when connected form a T. At each end of this member there is connected another tube that connects perpendicularly thereto and extends outwardly from the rear of the vehicle, thus forming a base having two tubes. These tubes form a wider, more stable base for connecting and securing the V-Shaped cargo carrier 10. The cargo carrier 10 has a member at the base of each wing (the first and second mounting members 11, 12) that connects to the respective twin tube, thus providing a stronger, more secure rack capable of carrying more weight because the weight is now divided between the two tubes, not all centered on a single tube member.

To prepare for installation, end caps are removed from the first mounting member 11, also referred to as a first leg or first wing, and the second mounting member 12, also referred to as a second leg or second wing of the V-Shaped cargo carrier 10. These mounting members 11, 12 are made from square or round metal tubing. These end caps are initially in place at the outmost ends of the tubings of the mounting members 11, 12, which are typically open. These caps are put in place to prevent water, dirt, and debris from entering the tubes of the mounting members 11, 12. Next, both the first and second mounting members 11, 12 are released and removed from wing bases at the base of the cargo carrier 10, leaving just the wing base. The cargo carrier cover preferably has two holes located at a bottom of the cargo carrier 10, adjacent to each other, that matingly fit over the wing bases. However, it is possible that the wings are formed off a single mounting member that extends up through the bottom of the cargo carrier. In this configuration then there would be only one hole in the bottom of the cargo carrier. Once the cargo carrier 10 is properly positioned over the wing bases, the first and second mounting members 11, 12 are reattached to the wing bases and secured in place.

Figure 3:
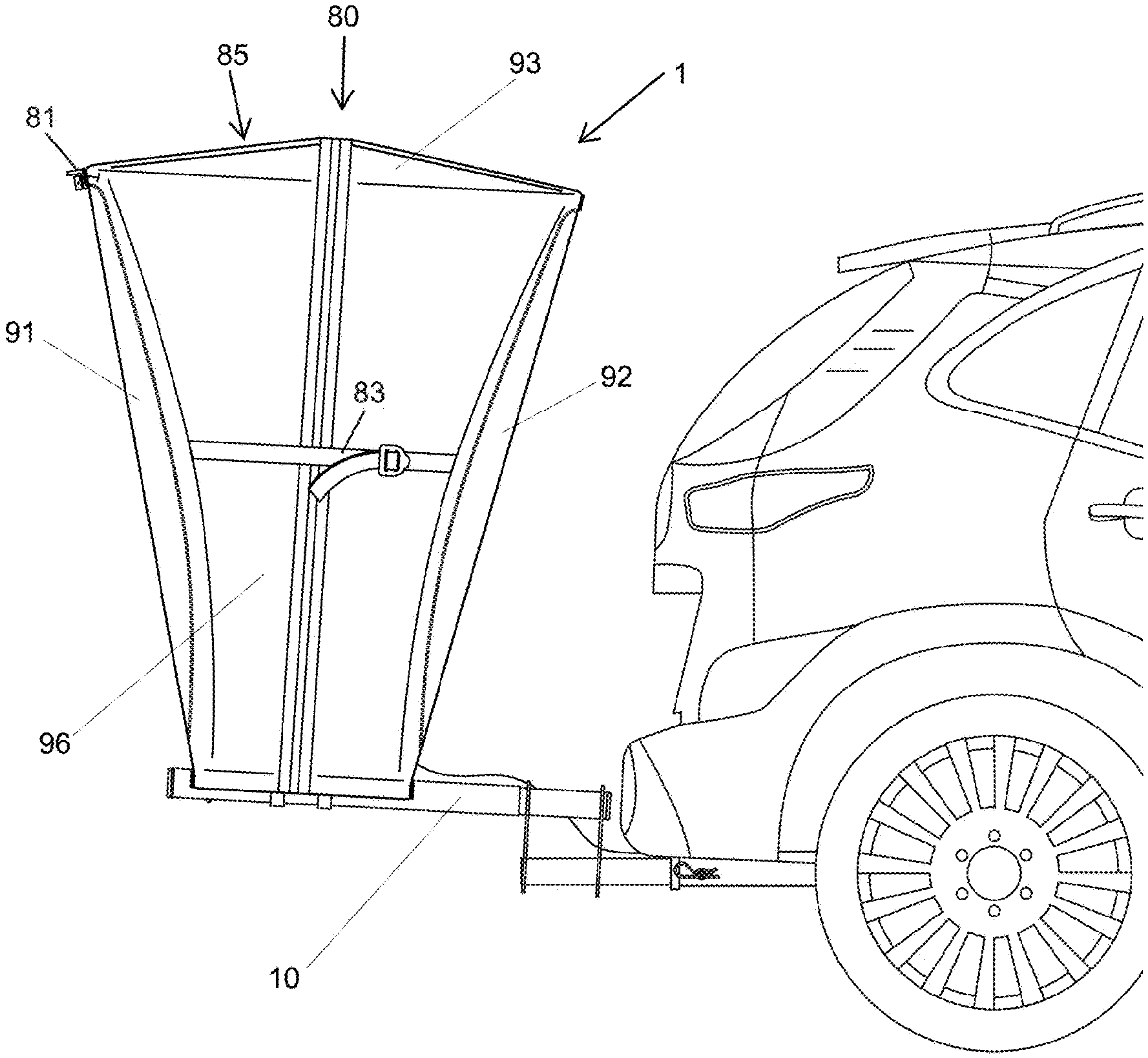
FIG. 3 is a right-side view of an embodiment of the cargo cover system on a cargo carrier on a vehicle.
Figure 8:
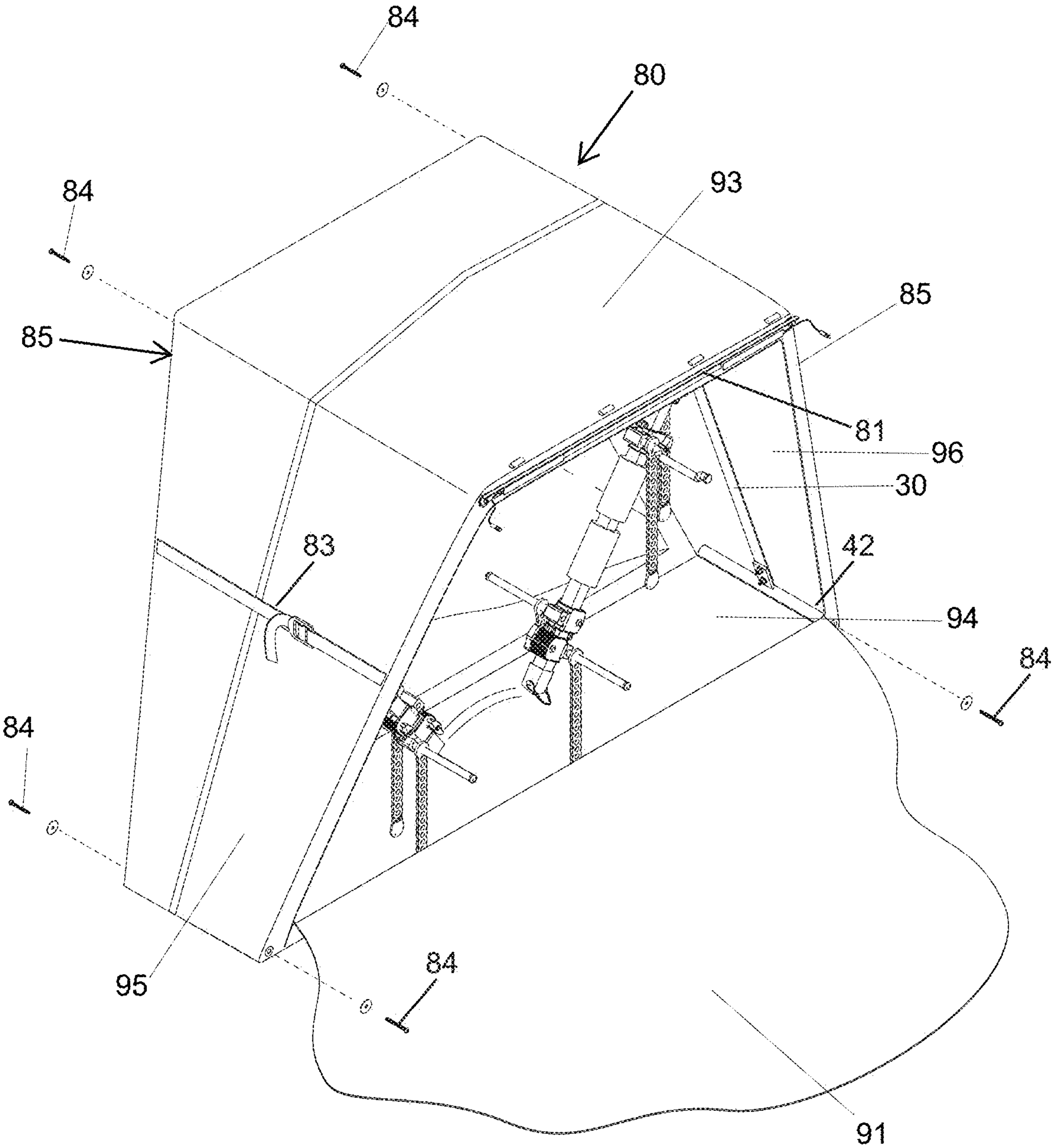
FIG. 8 is an elevated perspective view of the cargo carrier cover of the cargo cover system, with a front section of the cargo carrier cover open.

As shown in FIGS. 1 and 3, in a preferred embodiment, the cargo carrier cover 80 of the cargo cover system 1 is further comprised of a middle section 85, a front section 91, and a back section 92. The front section 91 and the back section 92 are removably attachable to the middle section 85. The middle section 85 has a front lip 86, a back lip 87, a top portion 93, a left-side portion 95, and a right-side portion 96. The front lip 86 and the back lip 87 are releasably attachable to the cargo carrier frame 20, via corner fasteners 84, as seen in FIG. 8.

Figure 6A:
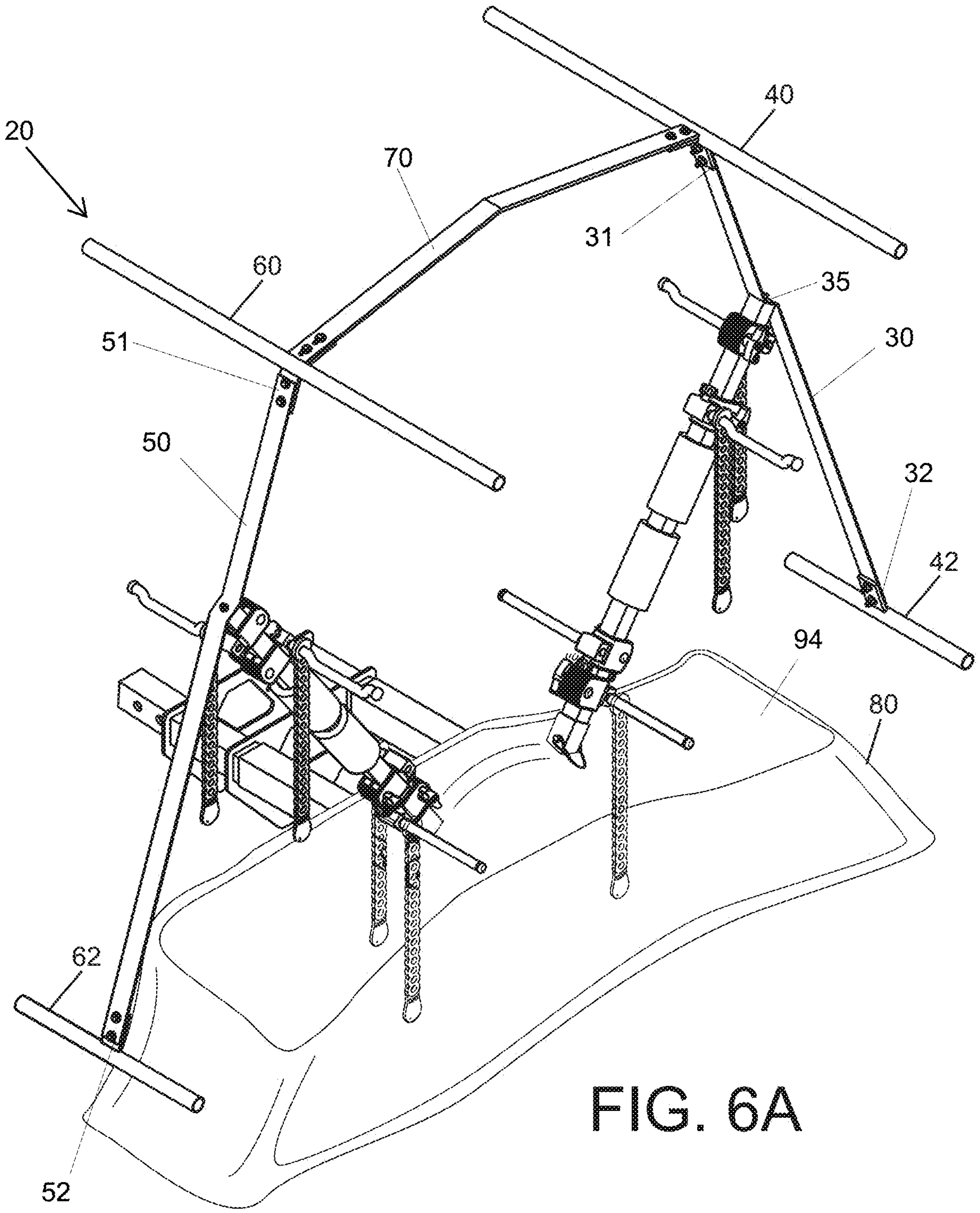
FIG. 6A is an elevated perspective view of the cargo cover system in FIG. 5, with a cargo cover frame of the cargo cover system fully assembled.
Figure 6B:
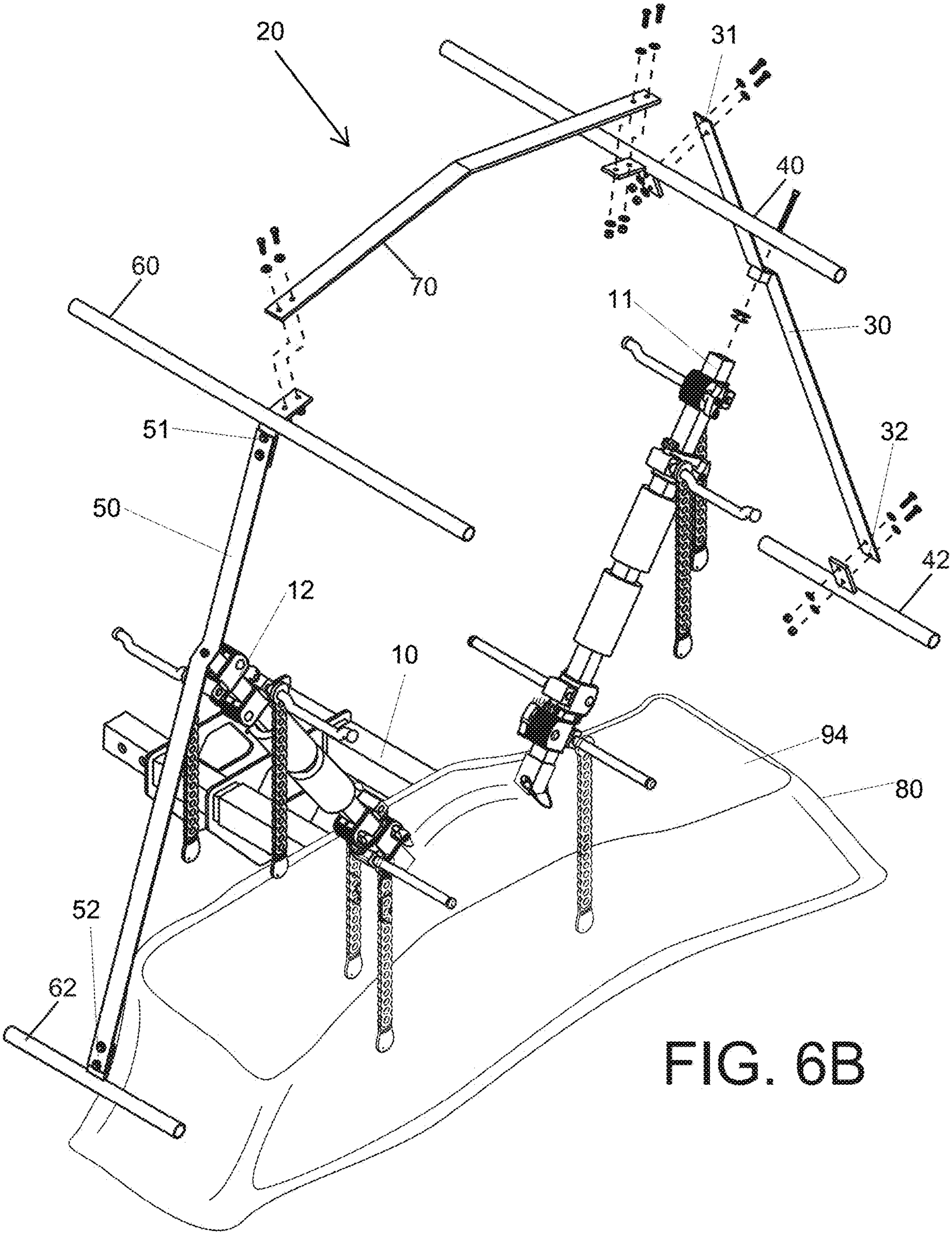
FIG. 6B is an elevated perspective view of the cargo cover system in FIGS. 5-6A, showing exploded view of the cargo cover frame.

In an embodiment, the middle section 85 of the cargo carrier cover 80 further has a bottom portion 94. The bottom portion 94 has a through hole 98 configured to receive the cargo carrier 10 therethrough. In a preferred embodiment, the through hole 98 is at least two through holes 98, whereby the first mounting member 11 and the second mounting member 12 of the cargo carrier 10 are inserted through corresponding through holes in the bottom portion 94 of the middle section 85 of the cargo carrier cover 80, as shown in FIGS. 6A-6B. Alternatively, the through hole could be a single hole where a single arm or wing extends through and that then splits into two wings once through the through hole. In an embodiment, the cargo carrier cover 80 also has a tensioning strap 83 across at least one of the left-side portion 95 or the right-side portion 96 of the middle section 85.

Figure 10A:
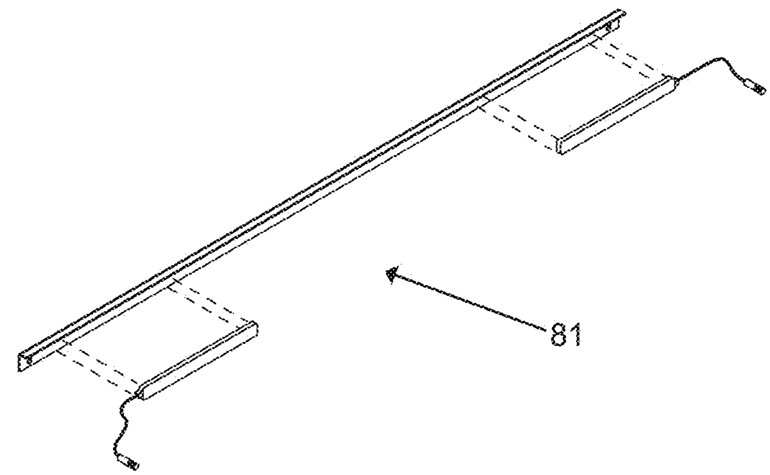
FIG. 10A is an elevated perspective view of an embodiment of a light for the cargo cover system.
Figure 10B:
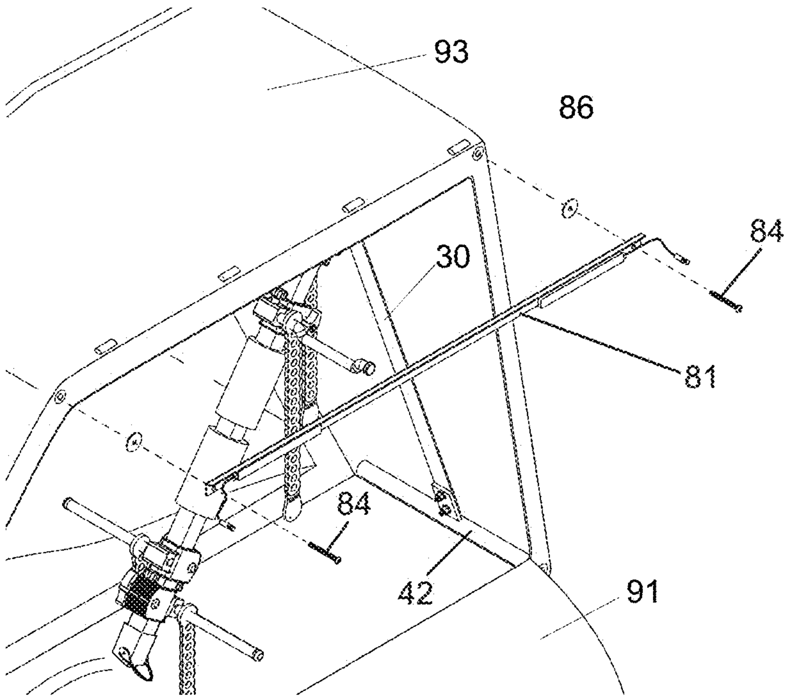
FIG. 10B is an elevated perspective view showing how the light shown in FIG. 10A would attach to the cargo cover system.
Figure 10C:
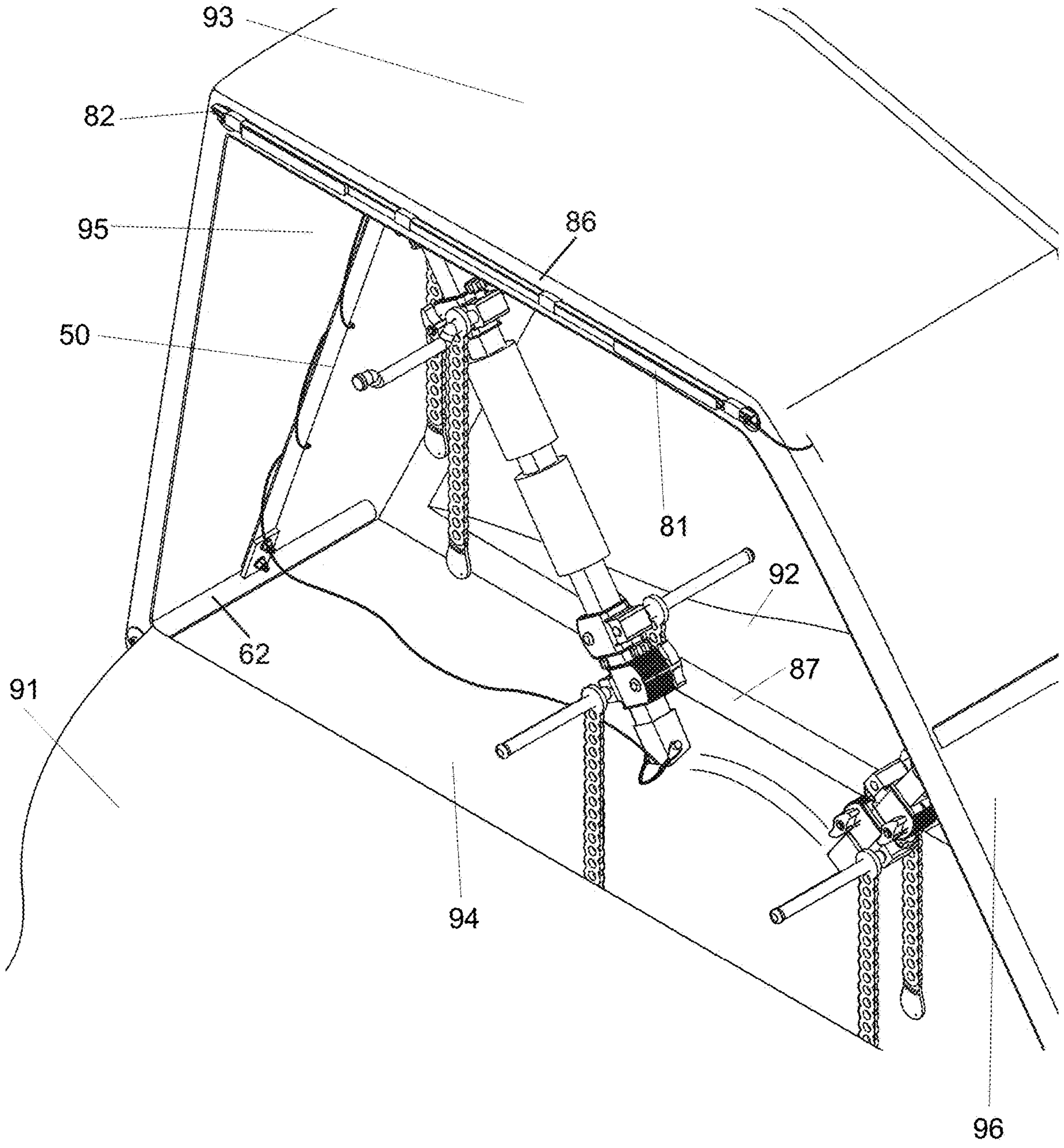
FIG. 10C is an elevated perspective view of the cargo cover system, showing how the light in FIGS. 10A-10B, can be attached to the cargo carrier cover, with a Velcro attachment member.

As shown in FIGS. 1 and 10B-10C, the top portion 93 of the middle section 85 of the cargo carrier cover 80 has a hook and loop connecting member extending across a front of the cargo carrier cover 80. The front of the cargo carrier cover 80 can be the front section 91 or the front lip 86 of the middle section 85. The hook and loop connecting member is for placement of a light 81 that is attachable to the cargo carrier cover 80. The light 81 can be an LED lighting member, as shown in FIGS. 1-4, 10A-10C and described herein below. The light 81 is connectable to and works with a vehicle lighting system. Thus, the hook and loop member must face away from the vehicle as it is designed to provide warning lights for vehicles following the cargo carrier 10. In a preferred embodiment, the cargo carrier cover 80 also has reflective strips (not shown).

Next, as shown in FIGS. 6A-7E, an embodiment of the elongated first side support member 30 of the cargo cover frame 20 is constructed. The elongated first side support member 30 shown has a first side support member first end 31 and a first side support member second end 32. The elongated first side support member 30 further has a first side support member first angle 33 and a first side support member second angle 34 that form a first side support member middle portion 35 between the first side support member first end 31 and the first side support member second end 32. The elongated second side support member 50, shown in FIGS. 6A-6B, has the same design, and has a second side support member first end 51 and a second side support member second end 52. The elongated second side support member 50 also further has a second side support member first angle 53 and a second side support member second angle 54 that form a second side support member middle portion 55 between the second side support member first end 51 and the second side support member second end 52. Each elongated side support member 30, 50 ideally has a corresponding side support member receiver hole 36, 56 located between the corresponding two angles 33, 34, 53, 54 in the corresponding side support member middle portion 35, 55, a corresponding side mounting member connecting apparatus 37, 57, a button head bolt or other similar corresponding fastener 39, 59, a washer, preferably a split ring washer, and a corresponding side locator 38, 58. The first side mounting member connecting apparatus 37 and the second side mounting member connecting apparatus 57 each can be a threaded tube nut as described above. The elongated first side support member 30 and the elongated second side support member 50 can be a flat member, or it can be rectangular, round, or any other geometrical design, as long as it can form the side support member. The elongated first and second side support members 30, 50 are mirror images of each other, as shown in FIGS. 6A-6B, and each has a short straight section (the first end 31, 51) that is approximately 12 inches long, followed by a much shorter straight side middle portion 35, 55 that is approximately 2 inches long, a first bend having an approximately 25 degree angle (the side first angle 33, 53), a longer, second straight section (the second end 32, 52) that is approximately 22 inches long, a second bend having an approximate 25 degree angle (the side second angle 34, 54). These are the preferred dimensions, but it should be noted that the lengths can be of any of a wide variety of lengths as can the angles be of a wide variety of angle dimensions. The preferred angles range from 15 to 35 degrees with preferred angles of 22 to 28 degrees. At the bottom of each of the side middle portions 35, 55 there is a side locator 38, 58 that is welded to the flat section of the side middle portions 35, 55 and that extends and telescopes into the corresponding mounting member 11, 12. Ideally each of these side locators 38, 58 is a square member, but it can be of any other configuration as long as it serves its purpose. The side locator could also be a plastic, rubber or other material that can be inserted into tubing to hold the support members in place. The first side locator 38 and the second side location 58 each has a centrally located through hole (the first receiver hole 36 or the second receiver hole 56) to accept the corresponding fastener (the first fastener 39 or the second fastener 59), that is ideally a button head bolt with a threaded end that matingly connects to the tube nut member.

To create each of these elongated side support member assemblies 30, 50, a corresponding side mounting member connecting apparatus 37, 57, which can be a tube nut, is inserted into a corresponding mounting member 11, 12, also referred to as a wing. These side mounting member connecting apparatuses 37, 57 are inserted into the mounting members 11, 12 and once pushed into the mounting members 11, 12, typically with a rubber mallet or some other tool to force them into the tube, the side mounting member connecting apparatuses 37, 57 will self-lock and are not removeable. Next, the corresponding side locator 38, 58 is inserted into the corresponding mounting member 11, 12 tube end so that the corresponding elongated side support member 30, 50 side support member first end 31, 51 (the long straight section) extends downwardly and at an angle away from the base of the V-Shaped cargo carrier 10 and the corresponding side support member second end 32, 52 (the short straight section) extends upwardly and at an angle towards the center of the V-Shaped cargo carrier 10, as shown in FIGS. 6A-6B. To secure the corresponding elongated side support member 30, 50 to the mounting member 11, 12, the split ring washer is placed over the corresponding fastener 39, 59 (the button head bolt), the corresponding fastener 39, 59 is then inserted through the corresponding side locator 38, 58 through hole and the corresponding fastener 39, 59 is screwed into the corresponding side mounting member connecting apparatuses 37, 57 and tightened. These connections should be left somewhat loose during initial installation, but once tightened the corresponding elongated side support member 30, 50 is affixedly secured in place. The corresponding side mounting member connecting apparatuses 37, 57 are now permanently secured and affixed within the mounting members 11, 12, but the elongated side support members 30, 50 can be removed if needed by simply unscrewing the fastener 39, 59. Reference is now made to FIGS. 6A-6B, 7C-7E. As can be seen in FIGS. 6A-6B, 7C-7E, there is a first side lower support member 42 (a short round support member) that is affixed to the first side support member second end 32 (the bottom end) of the elongated first side support member 30. Similarly, a second side lower support member 62 (a short round support member) is affixed to the second side support member second end 52 (the bottom end) of the elongated second side support member 50. Each of these lower support members 42, 62 is ideally round but can be any of a variety of shape that provides the support required to keep the cargo carrying case framed. These side lower support members 42, 62 are approximately 12 inches long but can be virtually any length as long as they do not interfere with the vehicle. Each end of the side lower support members 42, 62 have a fastener, such as a tube nut, inserted therein.

Figure 7C:
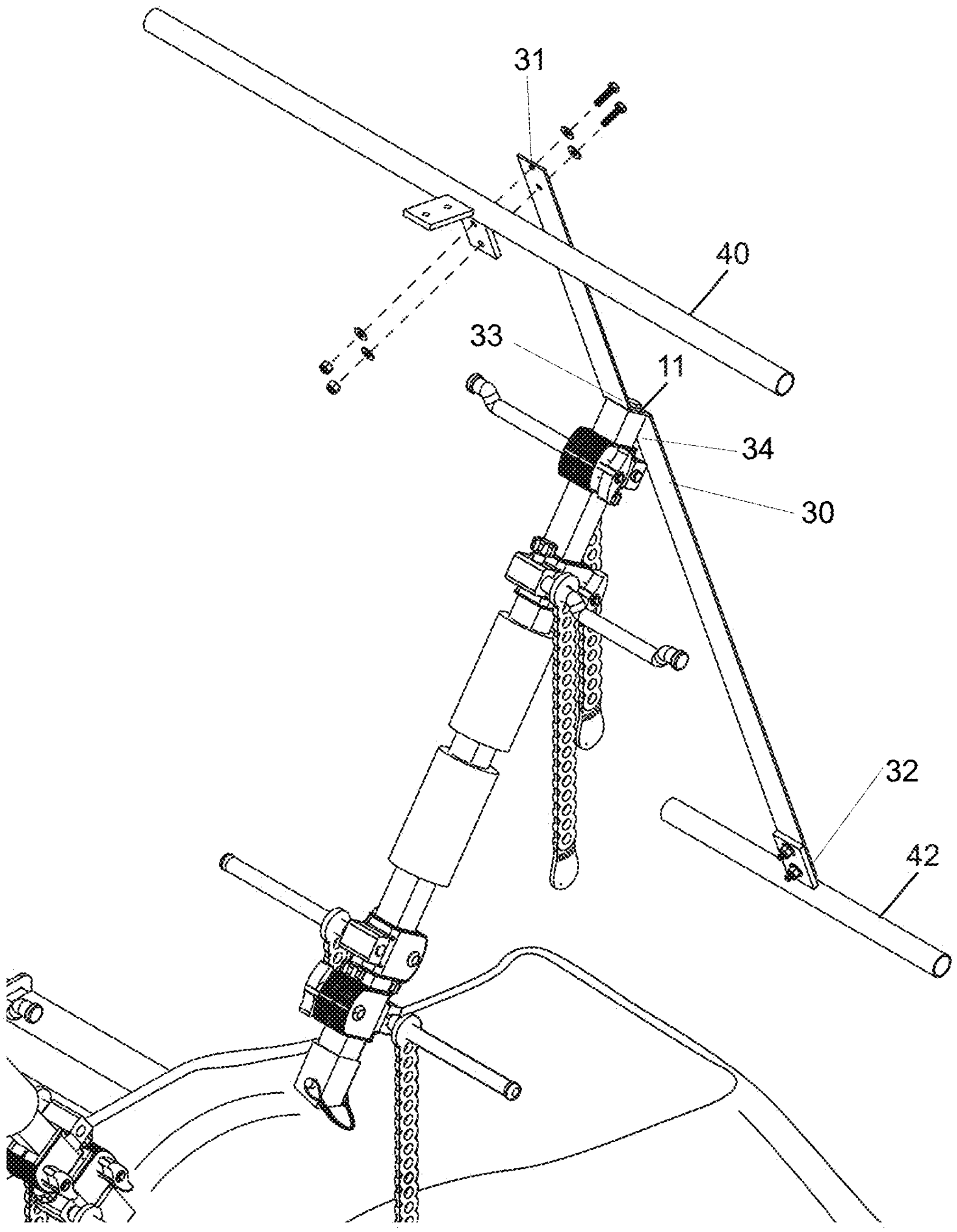
FIG. 7C is a perspective view of the elongated first side support member of the embodiment of the cargo cover system in FIGS. 5-7B, showing how of the elongated first side support member attaches to the first mounting member of the V-shaped cargo carrier, and also showing an exploded view of how the first side upper support member attaches to the elongated first side support member.
Figure 7D:
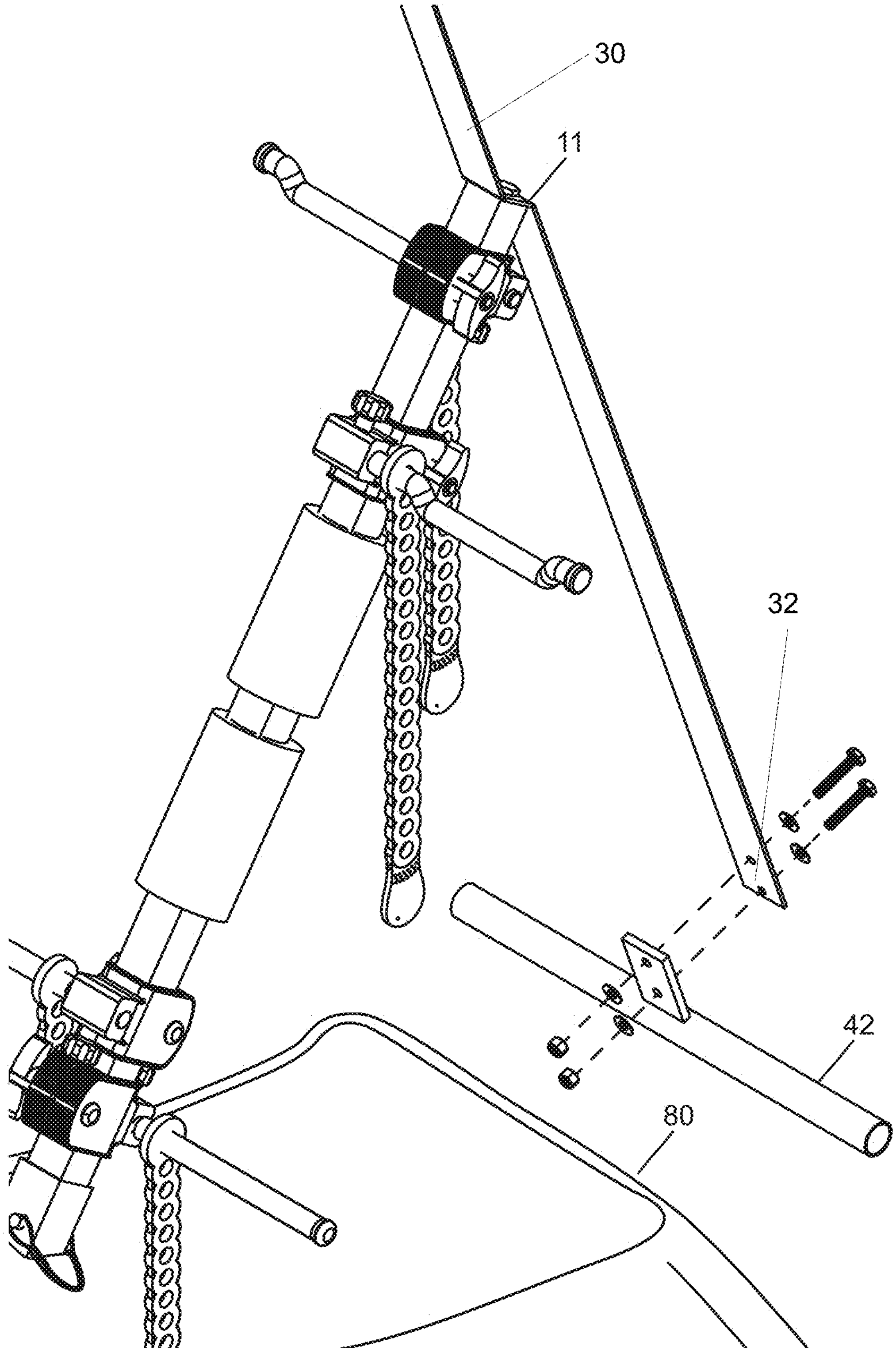
FIG. 7D is a close up of the first side lower support member of FIGS. 5-7C with connecting members that are screws and nuts, showing how the first side lower support member can be attached to the second end of the elongated first side support member.

FIG. 7D is a close-up view of the following attachment steps. Extending outwardly from the approximate center of the first side lower support member 42 is an attachment member. In one embodiment this attachment member is square or rectangular with at least one through hole and ideally two or more through holes. There are an equal number of at least one fastener, which can be bolts, washers, and nuts used to secure the first side lower support member 42 to the elongated first side support member 30, as shown in FIG. 7D. The first side support member second end 32 has at least one hole that matingly aligns with the attachment member through holes. To install: the holes are aligned; a first washer is placed over a first bolt; the bolt is inserted through a first hole on the first side support member second end 32 and then through the matingly aligned through hole in the attachment member of the side lower support member 42; a second washer is placed over the end of the first bolt; and a first nut is screwed onto the first bolt. The washer is then tightened to securely affix the first side lower support member 42 to the elongated side support member 30, 50. These same steps are followed to secure the second side lower support member 62 to the second side support member second end 52 of the elongated second side support member 50. The bolts can be any variety of bolt, the washer can be any variety of washer but is preferably a flat washer, and the nuts can be any variety of nut but are preferably nylock nuts.

Reference is now made to FIGS. 6A-6B, 7C. There is a side upper support member 40, 60 (a long round support member) that is affixed to a side support member first end 31, 51 of each of the elongated side support members 30, 50. The first side upper support member 40 and the second side upper support member 60 are approximately 36 inches long but could be any length that does not interfere with the vehicle. Each end of the side upper support member 40, 60 has a fastener, such as a tube nut, inserted therein. Focusing on the first side upper support member 40, extending outwardly from the approximate center of the first side upper support member 40 are two attachment members. A first attachment member aligns with and is matingly affixed to the elongated first side support member 30 and a second attachment member aligns with and is attached to the upper cross support 70 that extends across a top of the cargo carrier frame 20. This second attachment member points towards the center of the frame 20 configuration. That is, it points towards the frame 20 configuration's opposite side. In one embodiment, these attachment members are square or rectangular with at least one through hold, ideally having two or more through holes. There are an equal number of at least one fastener, such as bolts, washers, and nuts used to secure the first side upper support member 40 to the flat support bar. The flat bar upper end has at least one hole that matingly aligns with the elongated first side support member 30 through holes. To install: the holes are aligned; a first washer is placed over a first bolt; the bolt is inserted through a first hole on the elongated first side support member 30 and then through the mating aligned through hole in the attachment member; a second washer is placed over the end of the first bolt; and a first nut is screwed onto the first bolt. The washer is then tightened to securely affix the first side upper support member 40 to the elongated first side support member 30. These same steps are followed to secure any additional bolts and nuts and likewise are followed to secure the second side upper support member 60 to the second side support member first end 51 of the elongated second side support member 50. The bolts can be any variety of bolt, the washer can be any variety of washer but is preferably a flat washer, and the nuts can be any variety of nut but are preferably nylock nuts.

Figure 7E:
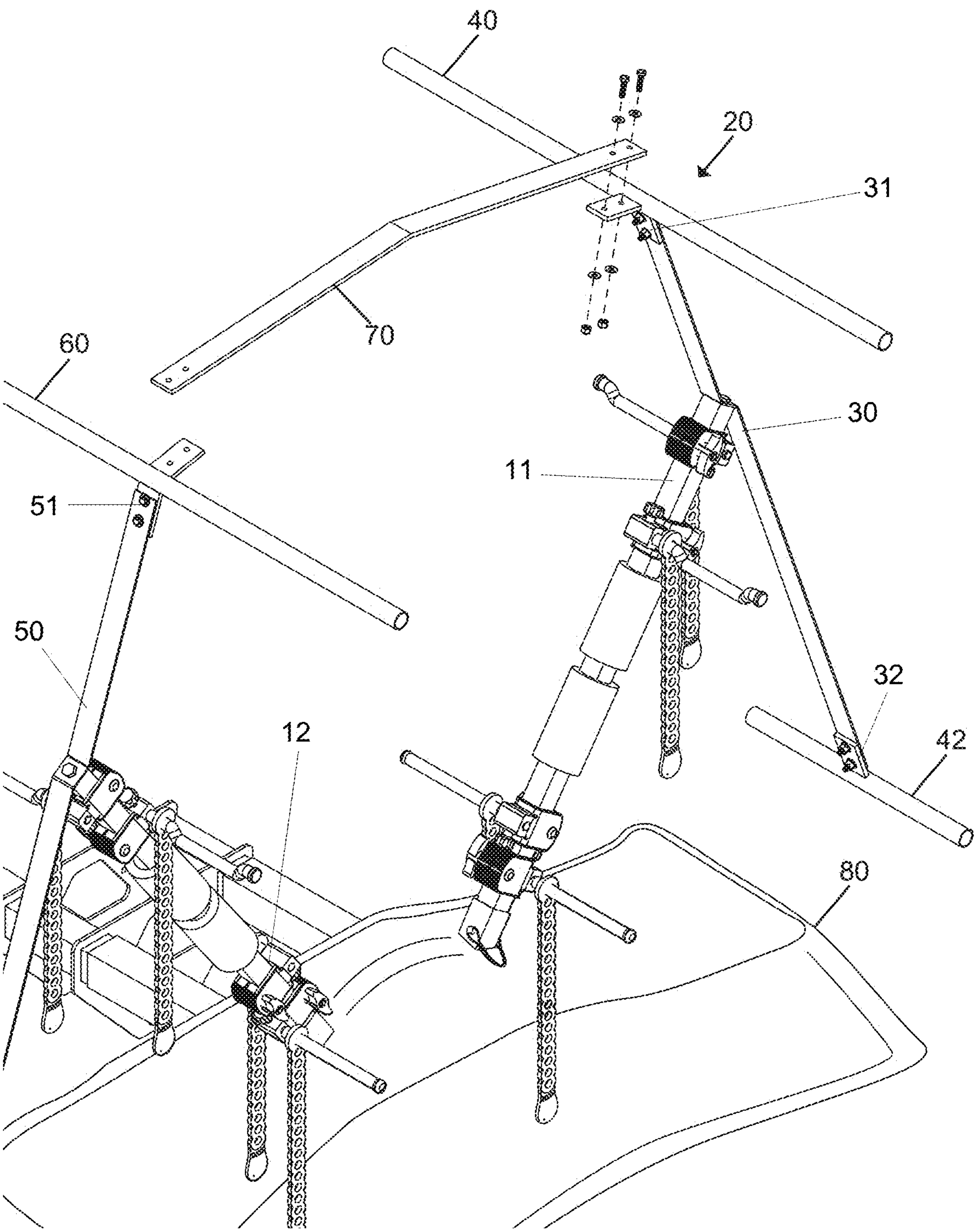
FIG. 7E is an elevated perspective view of the cargo cover frame of FIGS. 5-7D, showing an exploded view of the upper cross support to show how the upper cross support connects to the first end of the elongated first side support member and the first end of the elongated second side support member.

Once the first side upper support member 40 and the second side upper support member 60 are affixed to the corresponding elongated side support members 30, 50, the upper cross support 70 is installed, as is shown in FIGS. 6A-6B, 7E. As shown and described for the first and second side upper support members 40, 60, the upper cross support 70 has a first end and a second end, and each end has at least one hole that matingly aligns with at least one hole in the second attachment members of the first and second side upper support members 40, 60. Each of the second attachment member is positioned so that it faces the inside of the cargo cover frame 20 assembly. As before, to install: the holes are aligned; a first washer is placed over a first bolt (a fastener); the bolt is inserted through a first hole on the upper cross support 70 and then through the mating aligned through hole in the attachment member; a second washer is placed over the end of the first bolt; and a first nut is screwed onto the first bolt. The washer is then tightened to securely affix the first side upper support member 40 to the upper cross support 70. These same steps are followed to secure any additional bolts and nuts and likewise are followed to secure the second side upper support member 60 to the second end of the upper cross support 70. This final connection however is not performed until the cover is installed over the cargo cover frame 20, as described below. The bolts can be any variety of bolt, the washer can be any variety of washer but is preferably a flat washer, and the nuts can be any variety of nut but are preferably nylock nuts. After all the nuts and bolts are secured and tightened together the cargo cover frame 20 assembly is complete.

Next, the cover installation is shown and described in FIG. 8. To install the cargo carrier cover 80 (also referred to as the cover), take the cargo carrier cover 80 and pull it up and over the lower round support members, up along the flat support bars, up and over the long round support members and pull toward the bent support bar. Likewise, pull the second cover side up and over the first and second side lower support members 42, 62, up along the elongated first and second side support members 30, 50, up and over the first and second side upper support members 40, 60 and pull toward the upper cross support 70. The corners of the cargo carrier cover 80 should be positioned so that the ends of the first and second side upper support members 40, 60 and the ends of the first and second side lower support members 42, 62 are inserted therein. The upper cross support 70 should not yet be connected to the elongated second side support member 50 and this opening allows for the cargo carrier cover 80 to be completely installed over the cargo cover frame 20 assembly as it is not entirely rigid yet.

Next, the corners are secured, as shown in FIG. 8. The front lip 86 and the back lip 87 of the middle section 85 of the cargo carrier cover 80 have a grommeted hole located at each corner. Each corner grommeted hole aligns with the mating ends of the corresponding side lower support members 42, 62 and the corresponding side upper support members 40, 60. The end of each of the side lower support members 42, 62 and the side upper support members 40, 60 has the tube nut installed therein. A washer is placed inside the cargo carrier cover 80 between the side lower and upper support members 42, 62, 40, 60 and the cargo carrier cover 80 and another washer is placed between the outside of the cargo carrier cover 80 and a bolt head. A bolt with the bolt head is inserted through the outside washer, through the grommet, through the inside washer and is then threaded into the mating tube nut and tightened. This same operation is performed at all the remaining three corners. Any other fasteners besides bolts can also be used.

Once the cargo carrier cover 80 is pulled up and over the entire cargo cover frame 20 assembly and the corners are secured, the final connections are made between the upper cross support 70 and the elongated second side support member 50. These are then tightened, and the cargo cover system 1 secured.

Figure 9:
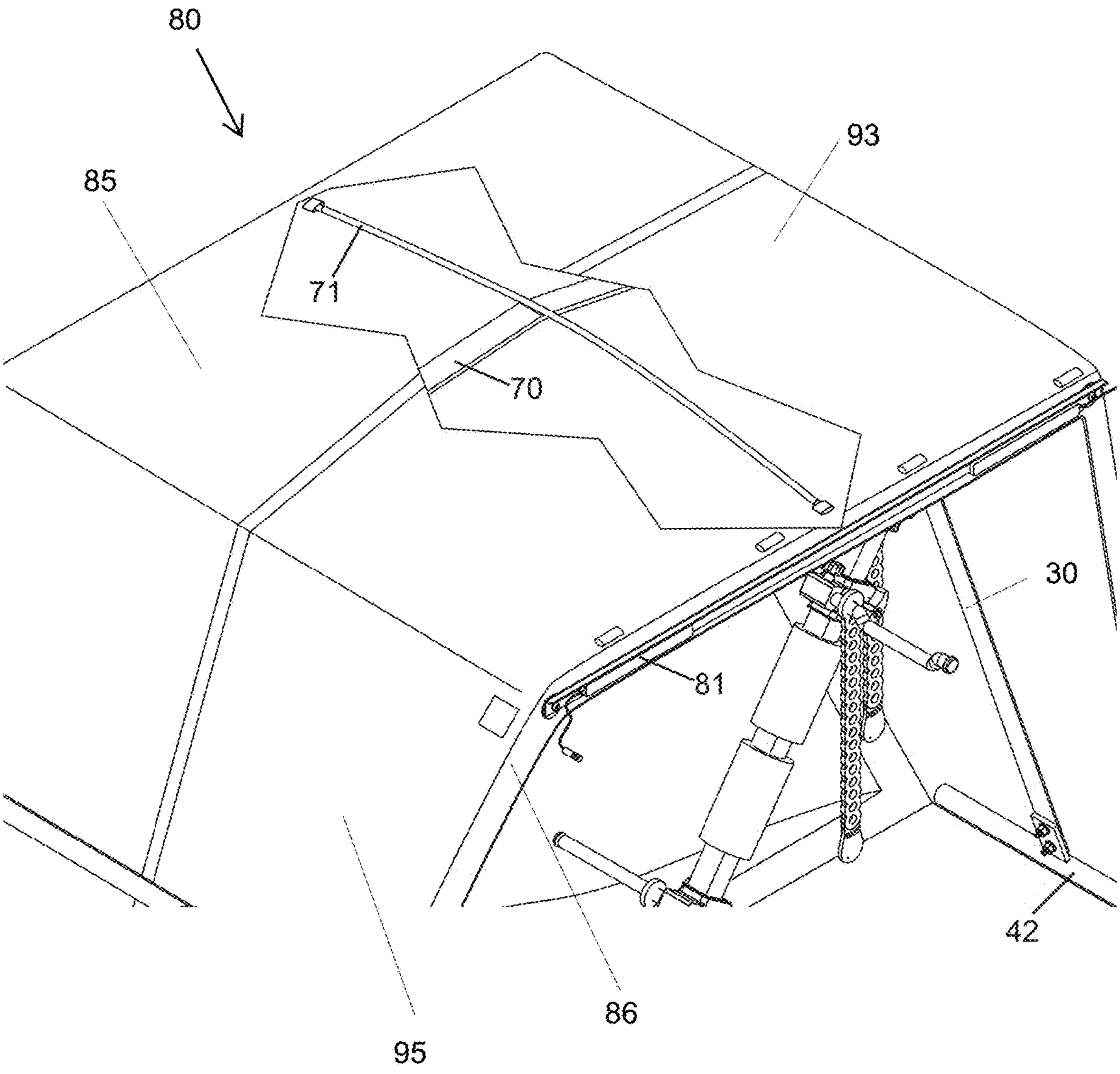
FIG. 9 is an elevated perspective view of the cargo cover system with the cargo carrier cover installed and a see-through section showing a front to back cross support attached to the cargo carrier cover, perpendicularly to the upper cross support.

In an embodiment, at least one front to back cross support 71 is attachable to the cargo carrier cover 80 perpendicular to the upper cross support 70. The front to back cross support 71 is inserted into opposing pockets at the top portion 93 of the middle section 85 of the cargo carrier cover 80, one each centrally located at a front and back of the top portion 93, as shown in FIG. 9. The front to back cross support 71 extends perpendicularly across the top of the upper cross support 70, a first end is inserted into a first pocket at the front of the top portion 93 and a second end is inserted into a second pocket at the back of the top portion 93.

Finally, a light 81, such as an LED light bar, is installed, as shown in FIGS. 10A-10C. As described above, there are hook and look members installed across the top portion 93 of the middle section 85 of the cargo carrier cover 80 facing away from the vehicle. A light 81, shown here as an LED light strip 81, is next installed. The LED light strip 81 is approximately as wide as the cargo carrier cover 80 at the top portion 93. The LED light strip 81 can either have hook and loop attachment material extending the entire length of the strip 81 or alternatively can have a series of connections positioned along the strip 81. The LED light strip 81 uses the hook and loop and is removably affixed to the cargo carrier cover 80. It is noted that this LED light strip 81 can be permanently affixed to the cargo carrier cover 80, it can be removably affixed to the cargo carrier cover 80 or it can be installed in any of a variety of ways, as long as it is visible and secured to the cargo carrier system 1. One end of the LED light strip 81 has an electric connection cable. One end of this cable is attached to the LED light strip 81, the other end has a lighting connection that connects to a vehicle lighting connection, and this end is woven through a pocket located on the inside of the cargo carrier cover 80, down the elongated first side support member to the bottom portion 94 of the middle section 85 of the cargo carrier cover 80 and back through the square holes at the bottom portion 94. From here, the lighting connection is connected to the vehicle lighting connection. Once connected the LED lights 81 mimic the lights from the vehicle, that is, breaking, flashing and turn signal lights. In an embodiment, the light 81 is two light strips attached to a bar, and the bar further comprises an electrical connector for stop, turn and hazard signals.

This same light cabling can be used to charge electric bicycles or any other electric apparatus capable of recharging that is secured, attached or hung from the cargo carrier system 1. Power is sent from the vehicle to the lights 81 and so it is an application to provide a connecting apparatus to connect to batteries that require charging. This is extremely convenient because the electric vehicle or bicycle can have the battery charged while being transported.

Figure 2A:
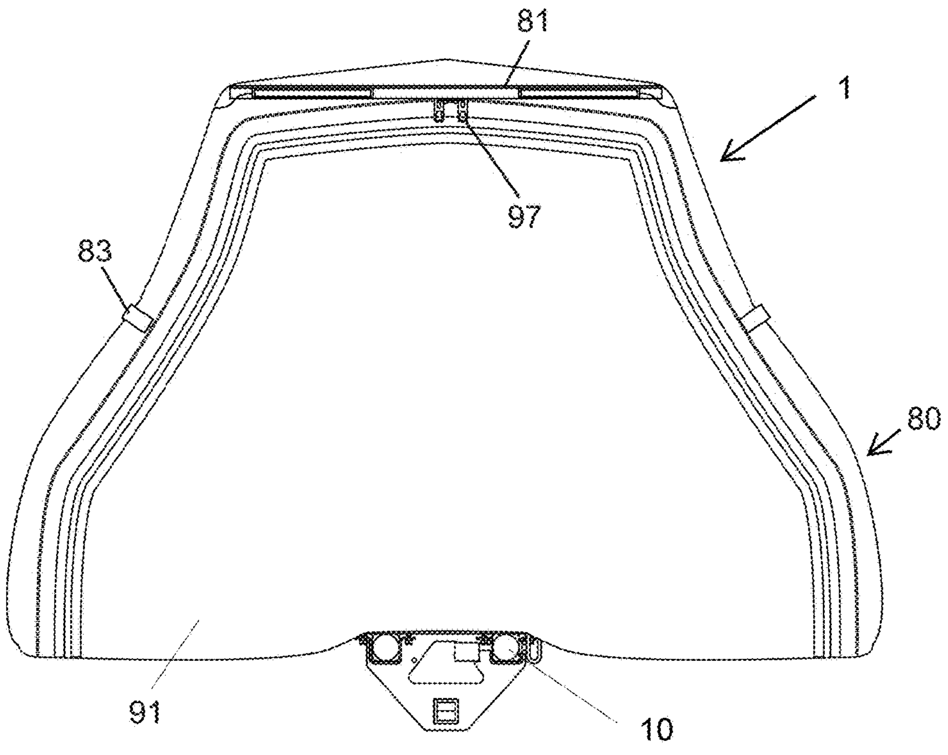
FIG. 2A is a front view of an embodiment of the cargo cover system when completely assembled.
Figure 2B:
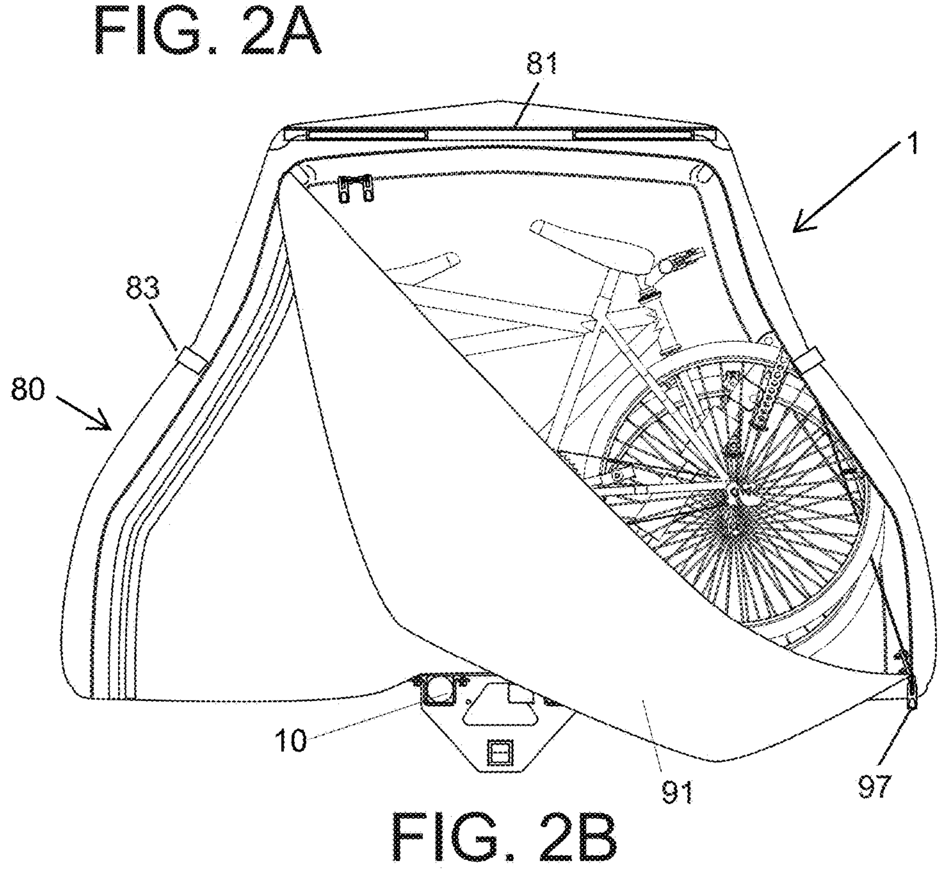
FIG. 2B is a front view of the cargo cover system in FIG. 2A, with the front section of the cargo carrier cover partially open.

The cargo carrier cover 80 has two doors, a front section 91 facing away from the vehicle and a back section 92 facing the vehicle, as can be seen in FIGS. 3 and 10C. These doors 91, 92 each are securely affixed across an entirety of the bottom portion 94 of the middle section 85 of the cargo carrier cover 80, one on each side. Each door 91, 92 has a zipper 97 that follows a perimeter of the middle section 85 of the cargo carrier cover 80, allowing the front section 91 and the back section 92 to be attachable to the middle section 85 of the cargo carrier cover 80. To close the doors 91, 92, the zipper 97 is zipped along the perimeter from one end to the other. This allows easy access to an interior of the cargo carrier system 1 for loading and unloading cargo. Once cargo is loaded and secured the doors 91, 92 are zippered shut. To secure the cargo within the cargo carrier system 1, a small lock or zipper clasp is used to connect a first side zipper to a second side zipper, as is shown in FIGS. 2A-2B. Finally, the cargo carrier cover 80 has side straps that extend from the front 91 to the back 92 of the cargo carrier cover 80 with a tightening member. Once cargo is loaded, zippered front 91 and back 92 are closed, the tightening member is tightened and the unit is tight, closed, locked and cargo secured within.

Figure 4:
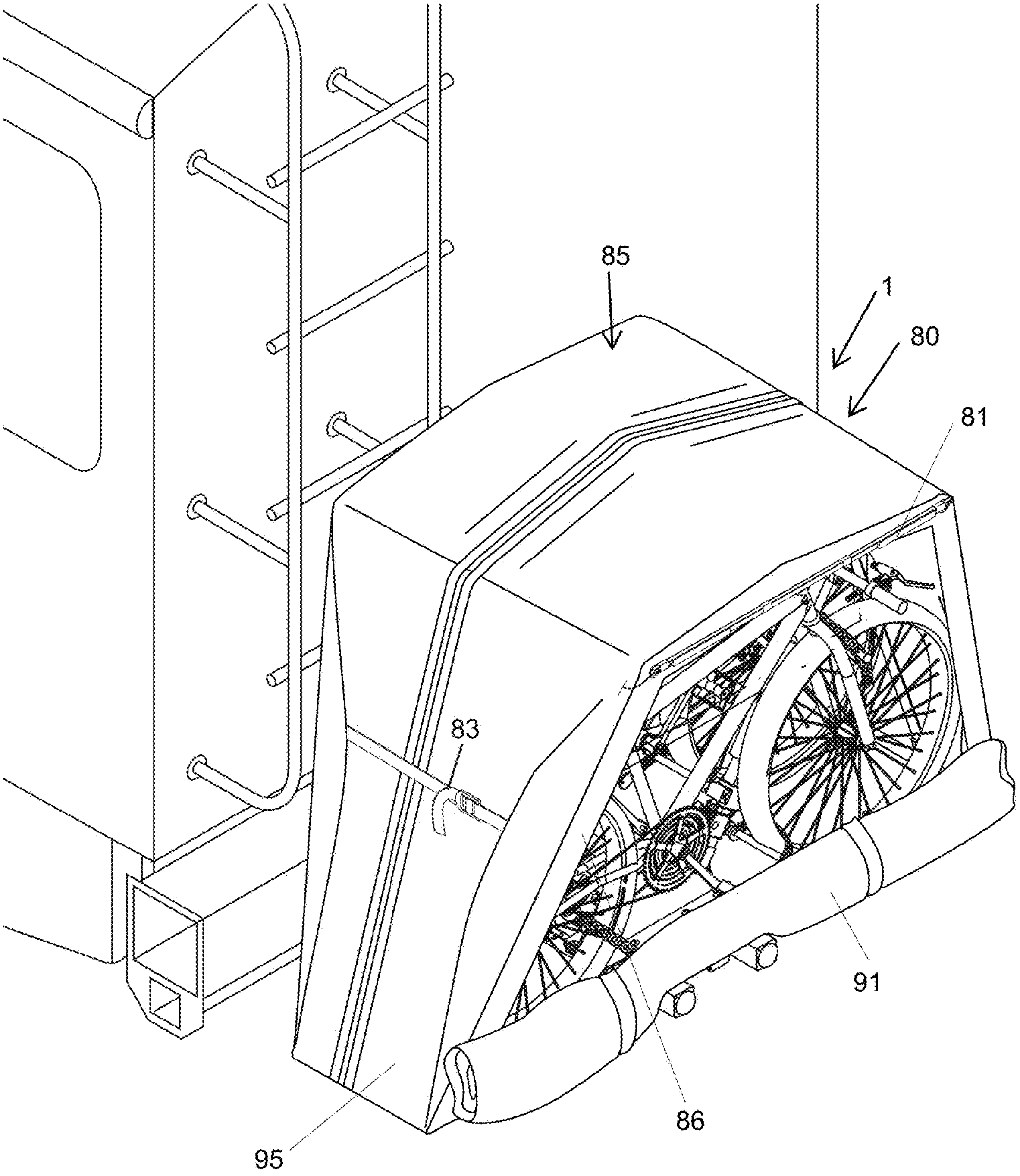
FIG. 4 is a perspective view of an embodiment of the cargo cover system on a cargo carrier on a recreational vehicle.

As shown in FIGS. 1, 4. 6A-7E, in a preferred embodiment, the first side support member first end 31 is shorter than the first side support member second end 32, the second side support member first end 51 is shorter than the second side support member second end 52, and the cargo carrier cover 80 is trapezoid shaped.

Figure 2C:
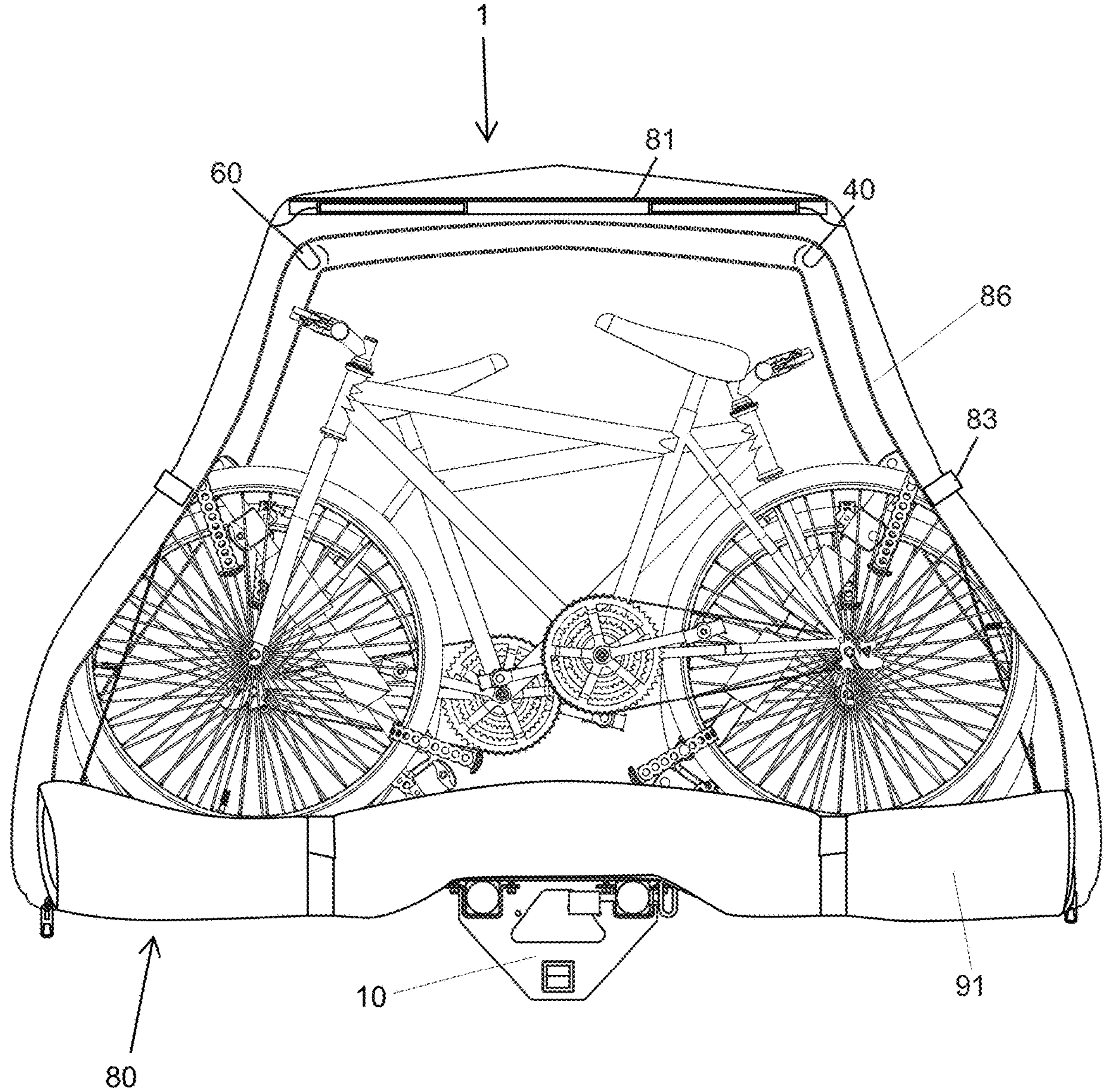
FIG. 2C is a front view of the cargo cover system in FIGS. 2A-2B, showing how the cargo carrier can store multiple bikes and with the front section of the cargo carrier fully open.

In an embodiment, the cargo cover system 1 is capable of covering and containing at least two bicycles, as seen in FIGS. 2B-2C, 4. In another embodiment, the cargo cover system 1 is shaped to cover and contain at least one of a unicycle, a bicycle, a tricycle, a motorcycle, a wheelchair, a scooter, a skateboard, a longboard, a surfboard, and a cart, but is not limited to the listed vehicles.

In an embodiment, roof panel inserts are added to increase rigidity of the top portion 93 of the middle section 85 of the cargo carrier cover 80. Additionally, rain run off features can be added to the top portion 93 of the middle section 85 of the cargo carrier cover 80 and drains can be added to the bottom portion 94 of the middle section 85 of the cargo carrier cover for any incidental water that may leak though the zippers 97 when in motion.

A method of building a cargo cover system 1 having a cargo carrier cover 80 and a cargo cover frame 20, where the cargo cover frame 20 is comprised of a first side support member 30 having a first end 31, a second end 32, a first angle 33, a second angle 34, a middle portion 35 with a receiver hole 36, a first side mounting member connecting apparatus 37, a first side locator 38, and a first fastener 39, a first side upper support member 40, a first side lower support member 41, a second side support member having a first end 51, a second end 52, a first angle 53, a second angle 54, a middle portion 55 with a receiver hole 56, a second side mounting member connecting apparatus 57, a second side locator 58, and a second fastener 59, a second side upper support member 60, and a second side lower support member 62, on a cargo carrier 10 having a first mounting member 11 and a second mounting member 12, comprises following steps: inserting the cargo carrier 10 through a bottom 94 of the cargo carrier cover 80; inserting the first side mounting member connecting apparatus 37 into the first mounting member 11 of the cargo carrier 10; inserting the first side locator 38 into the first mounting member 11 of the cargo carrier 10; inserting the first fastener 39 into the receiver hole 36 of the middle portion 35 of the first side support member 30 and into the first side locator 38 and the first side mounting member connecting apparatus 37 within the first mounting member 11 of the cargo carrier 10; affixing the first side support member 30 to the first mounting member 11 of the cargo carrier 10 via the first fastener 39; inserting the second side mounting member connecting apparatus 57 into the second mounting member 12 of the cargo carrier 10; inserting the second side locator 58 into the second mounting member 12 of the cargo carrier 10; inserting the second fastener 59 into the receiver hole 56 of the middle portion 55 of the second side support member 50 and into the second side locator 58 and the second side mounting member connecting apparatus 57 within the second mounting member 12 of the cargo carrier 10; affixing the second side support member 50 to the second mounting member 12 of the cargo carrier 10 via the second fastener 59; connecting the first side lower support member 42 and the first side upper support member 40 to the first side support member 30 and connecting the second side lower support member 62 and the second side upper support member 60 to the second side support member 50; and covering the cargo cover frame 20 with the cargo carrier cover 80. In an embodiment, there can be an additional step of affixing a light bar 81 to the cargo carrier cover 80 and connecting the light bar 81 to a vehicle's lighting system. In an embodiment, there can be an additional step of inserting at least one additional support pole 71 in the cargo carrier cover 80. In an embodiment, there the cargo cover frame 20 is further comprised of a cross support 70 and there can be an additional step of connecting the cross support 70 to the first side support member 30 and the second side support member 50.

Although the invention has been described with reference to the preferred embodiments illustrated in the attached drawing figures it is noted that equivalents may be employed and substitutions made herein without departing from the scope of the invention as recited in the claims.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Having thus described the various embodiments of the invention, what is claimed as new and desired to be protected by letters patent includes the following.

What is claimed is:

1. A cargo cover system for use with and connectable to a cargo carrier where the cargo carrier has at least a first mounting member and a second mounting member, the cargo cover system comprising:
  a cargo cover frame having:
    an elongated first side support member having:
      a first side support member first end;
      a first side support member second end;
      a first side support member first angle;
        a first side support member second angle; where
      the first and second angles form a first side support member middle portion between the first side support member first end and the first side support member second end;
      a first side support member receiver hole located between the two angles in the first side support member middle portion;
    a first side mounting member connecting apparatus, insertable into the cargo carrier first mounting member;
    a first side locator, insertable into the cargo carrier first mounting member; and
    a first fastener, where the first fastener is insertable through the first side support member receiver hole and the first side locator and is releasably affixable to the first side mounting member connecting apparatus;
    a first side upper support member perpendicularly connectable to the first side support member first end;
    a first side lower support member perpendicularly connectable to the first side support member second end;
    an elongated second side support member having:
      a second side support member first end;
      a second side support member second end;
      a second side support member first angle;
        a second side support member second angle; where the first and second angles form a second side support member middle portion between the second side support member first end and the second side support member second end;
      a second side support member receiver hole located between the two angles in the second side support member middle portion;
      a second side mounting member connecting apparatus, insertable into the cargo carrier second mounting member;
      a second side locator, insertable into the cargo carrier second mounting member; and
      a second fastener, where the second fastener is insertable through the second side support member receiver hole and the second side locator, and is releasably affixable to the second side mounting member connecting apparatus;
    a second side upper support member perpendicularly connectable to the second side support member first end; and
    a second side lower support member perpendicularly connectable to the second side support member second end; and
    a cargo carrier cover that covers the cargo cover frame.

2. The cargo cover system of claim 1, wherein the cargo cover frame further comprises:
  an upper cross support, connectable to the first side support member first end and the second side support member first end.

3. The cargo cover system of claim 1, wherein the cargo carrier cover further comprises:
  a middle section having
    a front lip,
    a back lip,
    a top portion,
    a left-side portion, and
    a right-side portion,
  where the front lip and the back lip are releasably attachable to the cargo carrier frame;
  a front section removably attachable to the middle section; and
  a back section removably attachable to the middle section.

4. The cargo cover system of claim 3, wherein the middle section of the cargo carrier cover further comprises:

a bottom portion, wherein the bottom portion of the middle section of the cargo carrier cover has a through hole configured to receive the cargo carrier therethrough.

5. The cargo cover system of claim 4, wherein the through hole is at least two through holes, whereby the first mounting member and the second mounting member of the cargo carrier are inserted through corresponding through holes in the bottom portion of the middle section of the cargo carrier cover.

6. The cargo cover system of claim 1, wherein the first side upper support member connects to the first side support member first end via at least one fastener, the first side lower support member connects to the first side support member second end via at least one second fastener, the second side upper support member connects to the second side support member first end via at least one third fastener, and the second side upper support member connects to the second side support member second end via at least one fourth fastener.

7. The cargo cover system of claim 1, wherein a light is attachable to the cargo carrier cover.

8. The cargo cover system of claim 7, wherein the light is connectable to and works with a vehicle lighting system.

9. The cargo cover system of claim 2, wherein at least one front to back cross support is attachable to the cargo carrier cover perpendicular to the upper cross support.

10. The cargo cover system of claim 3, wherein the front section of the cargo carrier cover is attachable to the middle section of the cargo carrier cover via a zipper, and the back section of the cargo carrier cover is attachable to the middle section of the cargo carrier cover via a second zipper.

11. The cargo cover system of claim 1, wherein the first side support member first end is shorter than the first side support member second end, the second side support member first end is shorter than the second side support member second end, and the cargo carrier cover is trapezoid shaped.

12. The cargo cover system of claim 1, wherein the cargo carrier cover has reflective strips.

13. The cargo cover system of claim 1, wherein the cargo cover system is capable of covering and containing at least two bicycles.

14. The cargo cover system of claim 1, wherein the cargo cover system is shaped to cover and contain at least one of a unicycle, a bicycle, a tricycle, a motorcycle, a wheelchair, a scooter, a skateboard, a longboard, a surfboard, and a cart.

15. The cargo cover system of claim 8, wherein the light is two light strips attached to a bar, and the bar further comprises an electrical connector for stop, turn and hazard signals.

16. The cargo cover system of claim 1, wherein the cargo carrier cover is made of heavy-duty, durable waterproof PVC material.

17. A method of building a cargo cover system having a cargo carrier cover and a cargo cover frame, where the cargo cover frame is comprised of a first side support member having a first end, a second end, a first angle, a second angle, a middle portion with a receiver hole, a first side mounting member connecting apparatus, a first side locator, and a first fastener, a first side upper support member, a first side lower support member, a second side support member having a first end, a second end, a first angle, a second angle, a middle portion with a receiver hole, a second side mounting member connecting apparatus, a second side locator, and a second fastener, a second side upper support member, and a second side lower support member, on a cargo carrier having a first mounting member and a second mounting member, the method of building the cargo carrier cover system comprising the steps of:

inserting the cargo carrier through a bottom of the cargo carrier cover;

inserting the first side mounting member connecting apparatus into the first mounting member of the cargo carrier;

inserting the first side locator into the first mounting member of the cargo carrier;

inserting the first fastener into the receiver hole of the middle portion of the first side support member and into the first side locator and the first side mounting member connecting apparatus within the first mounting member of the cargo carrier;

affixing the first side support member to the first mounting member of the cargo carrier via the first fastener;

inserting the second side mounting member connecting apparatus into the second mounting member of the cargo carrier;

inserting the second side locator into the second mounting member of the cargo carrier;

inserting the second fastener into the receiver hole of the middle portion of the second side support member and into the second side locator and the second side mounting member connecting apparatus within the second mounting member of the cargo carrier;

affixing the second side support member to the second mounting member of the cargo carrier via the second fastener;

connecting the first side lower support member and the first side upper support member to the first side support member and connecting the second side lower support member and the second side upper support member to the second side support member; and covering the cargo cover frame with the cargo carrier cover.

18. The method of building a cargo cover system in claim 17, wherein there is an additional step of:

affixing a light to the cargo carrier cover and connecting the light to a vehicle's lighting system;

affixing a charging cable;

using power from the vehicle's lighting system; and charging an electric vehicle.

19. The method of building a cargo cover system in claim 17, wherein there is an additional step of:

inserting at least one additional support pole in the cargo carrier cover.

20. The method of building a cargo cover system in claim 17, wherein there the cargo cover frame further comprises a cross support, and wherein there is an additional step of:

connecting the cross support to the first side support member and the second side support member.

* * * * *